US009709077B2

(12) United States Patent
Shah et al.

(10) Patent No.: US 9,709,077 B2
(45) Date of Patent: Jul. 18, 2017

(54) HYDRO PNEUMATIC ACCUMULATOR WITH INTERNAL LEAK DETECTION

(71) Applicant: ROTEX Manufacturers and Engineers Private Limited, Dombivali East, Maharashtra (IN)

(72) Inventors: Amit Shah, Mumbai (IN); Ajit Kothadia, Mumbai (IN)

(73) Assignee: ROTEX Manufacturers and Engineers Limited, Maharastra (IN)

( * ) Notice: Subject to any disclaimer, the term of this patent is extended or adjusted under 35 U.S.C. 154(b) by 21 days.

(21) Appl. No.: 15/002,414

(22) Filed: Jan. 21, 2016

(65) Prior Publication Data

US 2017/0175778 A1 Jun. 22, 2017

(30) Foreign Application Priority Data

Dec. 17, 2015 (IN) ......................... 4736/MUM/2015

(51) Int. Cl.
*F16L 55/04* (2006.01)
*F15B 1/24* (2006.01)

(52) U.S. Cl.
CPC ...................................... *F15B 1/24* (2013.01)

(58) Field of Classification Search
USPC ...................................................... 138/30, 31
See application file for complete search history.

(56) References Cited

U.S. PATENT DOCUMENTS 3,669,151 A * 6/1972 Fleming .................. F15B 1/027 137/116.5
4,471,797 A * 9/1984 Cass ..................... F15B 20/005 137/100
5,024,250 A * 6/1991 Nakamura ................ F15B 1/08 138/104
6,206,484 B1 * 3/2001 Ganzel .................... B60T 8/268 188/358
7,740,183 B2 * 6/2010 Knapp .................... F16K 3/265 137/625.48
9,199,621 B2 * 12/2015 Noro ....................... B60T 13/58

(Continued)

*Primary Examiner* — James Hook

(57) ABSTRACT

A piston type hydro pneumatic accumulator with internal leak detection, having a gas chamber and a liquid chamber, the piston type hydro pneumatic accumulator comprising a cylindrical barrel, a floating piston, a gas end cover, a liquid end cover, a leakage detection construction having a first cylindrical channel reducing to a conical channel and further reducing to a second cylindrical channel, a floater device, the gas end cover and the liquid end cover hermetically disposed into the cylindrical barrel, a first pressure meter disposed so as to measure a pressure in the first cylindrical channel and a second pressure meter disposed so as to measure the pressure in the second cylindrical channel, the readings in the two pressure meters used for inferring a gas leakage or a liquid leakage. Also deployable a first pressure switch sensing a pressure P1 and a second pressure switch sensing a pressure P2, the output of the first pressure switch and the second pressure switch connected to a programmable logic controller, programmed so as to activate a liquid circuit for topping up of the liquid if P1>P2, activate a gas circuit for re-charging of gas if P1=P2≠0, produce a visual and or an audio signal or a combination thereof, or initiate any other corrective action.

18 Claims, 25 Drawing Sheets

(56) References Cited

U.S. PATENT DOCUMENTS

| | | | | |
|---|---|---|---|---|
| 2004/0238054 | A1* | 12/2004 | Weber | F15B 1/24 138/31 |
| 2011/0251776 | A1* | 10/2011 | Bartell | F02M 69/045 701/103 |

* cited by examiner

FIG 6F
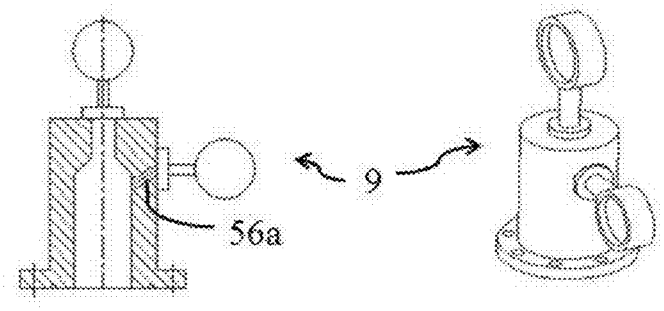
FIG 6E
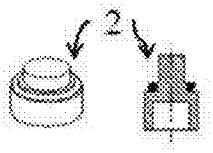
FIG 6D
FIG 6C

HYDRO PNEUMATIC ACCUMULATOR WITH INTERNAL LEAK DETECTION

The following specification particularly describes the invention and the manner in which it is to be performed.

FIELD OF INVENTION

This invention relates to Hydro Pneumatic Accumulators. Particularly, the invention relates piston type hydro pneumatic accumulators. More particularly this invention relates to piston type hydro pneumatic accumulators with arrangement to detect inter-fluid leakage.

BACKGROUND OF THE INVENTION

A hydro pneumatic accumulator is conceptually a device wherein one fluid under pressure is utilized as potential energy for performing useful work through the medium of another fluid. A hydro pneumatic accumulator is typically used in a hydraulic system for preventing the pressure of a hydraulic fluid, e.g., an oil, from rising excessively or falling suddenly due to temporary accumulating or discharging of oil or any turbulence in the hydraulic system. For example, the accumulator temporarily accumulates oil fed from a pump while a fluid-actuated device such as a hydraulic motor is turned off. When the device is actuated again, the accumulator discharges accumulated oil and feeds it rapidly to the device until more oil from the pump reaches the device. Another example is hydraulic control of electric circuit breakers.

The accumulator is generally classified as either a flexible gas chamber type accumulator or a piston type accumulator. A flexible gas chamber type accumulator usually comprises a cylindrical shell and a gas recharged bladder or diaphragm or bellow incorporated therein, which is inflated and deflated in response to the change of pressure of liquid contained in the hydraulic system. A piston type accumulator comprises a cylindrical shell and a reciprocating piston therein, conceptually floating, which changes the volume of liquid chamber and that of a gas chamber bounded thereby. U.S. Pat. No. 3,613,734A discloses such a piston type accumulator. A combination type accumulator is also known as disclosed in U.S. Pat. No. 2,688,984.

While piston type accumulator has proven to be robust and naturally dampening the pressure spikes encountered in the use, inter-chamber leakage, primarily from periphery of the piston is a known challenge. Multiple piston rings and seals are provided, to check inter-chamber leakage. Patent application with International Publication Number WO1989/03483 discloses a seal ring in the end cover as a valve which prevents the gas from escaping from the accumulator if it is completely emptied for fluid.

All seals and preventive measures have a life, which varies and therefore, it remains unknown as to when the inter-chamber leakage commences. Some users top up the gas chamber periodically to combat such unpredictability.

There is a need in the art to detect inter-chamber leak early enough and take corrective action.

OBJECTIVE OF THE INVENTION

The objective is to invent an arrangement for detecting inter-chamber leak in a piston type hydro pneumatic accumulator.

Another objective is to invent an integral arrangement for detecting inter-chamber leak.

Another objective is to invent an addable arrangement for detecting inter-chamber leak.

Yet another objective is to invent an arrangement that continuously keeps the piston type hydro pneumatic in usable condition.

BRIEF DESCRIPTION OF DRAWINGS

FIG. 2A is a line graph showing pressure gradient of a gas and a liquid when the liquid leaks into a gas chamber, while

FIG. 6A to FIG. 6F show parts of a third embodiment of the hydro pneumatic accumulator in sectional view as well as perspective view.

SUMMARY OF THE INVENTION

Figure 1:
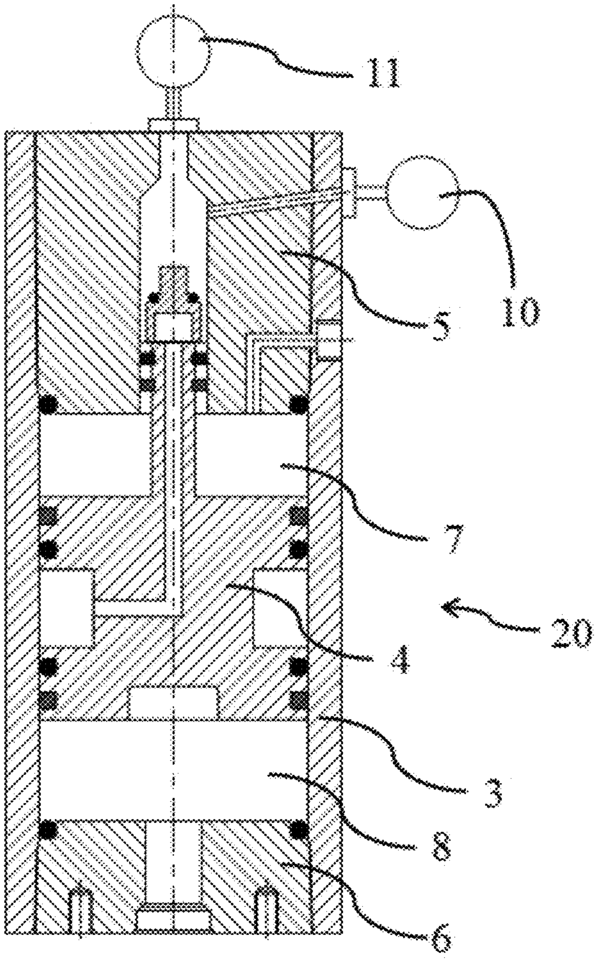
FIG. 1 shows sectional view of a preferred embodiment of a piston type hydro pneumatic accumulator as per present invention.

This invention relates to piston type hydro pneumatic accumulators with arrangement to detect inter-fluid leakage. The piston type hydro pneumatic accumulator comprises of a cylindrical barrel, a floating piston, a gas end cover, a liquid end cover, a first pressure meter and a second pressure meter. The accumulator has a gas chamber and a liquid chamber. In the preferred embodiment, the hydro pneumatic accumulator has an integrated leakage detection construction in the gas end cover, comprising a first cylindrical channel commencing from an inner face of the gas end cover, the first cylindrical channel reduces to a conical channel having an inclined surface and the conical channel further reduces to a second cylindrical channel, which is narrower. A connection path commences from an upper region of the first cylindrical channel and the distant opening of the connection path opens from the external cylindrical surface of the gas end cover. A re-charge path having a re-charge path opening commences from the external cylindrical surface of the gas end cover. The other open end of the re-charge path is on the inner face of the gas end cover. As the gas end cover is mounted into the cylindrical barrel, the distant opening of the connection path aligns axially with the first orifice of the cylindrical barrel and the re-charge path opening axially aligns with the second orifice of the cylindrical barrel.

A floater device comprises of a floater and an O-ring. The floater is of a material which is chemically neutral with respect to a gas and a liquid with which the gas chamber and the liquid chamber of the hydro pneumatic accumulator respectively are filled. The floater has a hollow zone of a volume such that when the hollow zone is filled with the gas then a weight of the floater more or less balances the buoyant force of the gas, and therefore the floater device remains suspended or sunk in the gas; while when the hollow zone is filled with the rising liquid from below the floater device then the buoyant force of the liquid is significantly higher than the weight of the floater device and the floater device floats on the liquid. The liquid end cover has an axial bore and a connection flange. Also a first pressure meter is mounted on the first orifice of the cylindrical barrel while a second pressure meter is mounted on the second cylindrical channel.

When there is no internal leakage of the gas into the liquid chamber or the liquid into the gas chamber, the first cylindrical channel of the gas end cover is free of any gas or liquid, and the first pressure meter as well as the second pressure meter shows a zero reading. When there is a leakage of the gas towards the liquid chamber, the gas first ingresses to the annular hollow ring of the floating piston, then through the hollow tube of the floating piston, fills in the hollow zone of the floater. The floater device attains suspended position and lets the gas fill the first cylindrical channel, the conical channel and the second cylindrical channel. The first pressure meter as well as the second pressure meter shows a low non-zero reading, indicating a gas leak towards or into the liquid chamber. When the gas leakage is rapid such that the gas also reaches the liquid chamber, the outcome is the same, that is, the first pressure meter as well as the second pressure meter shows the low but non-zero reading.

When there is a leakage of the liquid towards the gas chamber, the liquid first ingresses to the annular hollow ring of the floating piston, then starts filling in the hollow zone of the floater through the hollow tube of the floating piston. Consequently, the floater device starts rising up towards the conical channel as more and more liquid arrives in the first cylindrical channel, till the O-ring of the floater device mates with the inclined surface of the conical channel and insulates the second cylindrical channel from the first cylindrical channel. In such a situation, the second pressure meter shows a zero reading while the first pressure meter shows a substantially high reading, inferring the liquid leak into or towards the gas chamber.

In another embodiment, the leakage detection construction is a separable component, mounted on an interface plate. The interface plate in-turn is disposed on the gas end cover. In yet another embodiment, there is a leakage detection construction as a separable component, mounted on an interface plate. The interface plate in-turn is disposed on a transversal face of the guide shaft of the floating piston. Consequent to the interface plate disposed on the transversal end of the floating piston, the separable component along with the floating device therein, the first pressure meter and the second pressure meter thereon, and the interface plate, keep moving up and down in accordance with the movement of the floating piston during the normal course of working of the hydro pneumatic accumulator.

The floater device can be spherical in shape, and of a material which is chemically neutral with respect to a gas and a liquid with which the gas chamber and the liquid chamber of the hydro pneumatic accumulator are filled. The spherical floater is of such dimension that a volume of substantially half of the spherical floater more or less balances the buoyant force of the gas, and therefore the spherical floater remains suspended or sunk in the gas; while when the first cylindrical channel is filled with the liquid then the buoyant force of the liquid is much higher than the weight of the floater and the spherical floater floats on the liquid. The leakage detection construction has a dome shape.

In place of, or in additional to, the pressure meters et cetera; pressure switches are provided whose output is connected to a known programmable logic controller. If the pressure sensed by the first pressure switch is P1 and the pressure sensed by the second pressure switch is P2, then the programmable logic controller is programmed so as to activate a liquid circuit for topping up of the liquid if $P1>P2$; a gas circuit for re-charging of gas if $P1=P2\neq 0$; producing visual and or audio signal or a combination thereof; or initiate any other corrective action.

DETAILED DESCRIPTION OF INVENTION

The preferred embodiment of present invention is described with the aid of the drawings. Several variations of present invention are possible and therefore the description of the embodiments should not be construed to limit the scope of this invention in any manner.

Figure 2A:
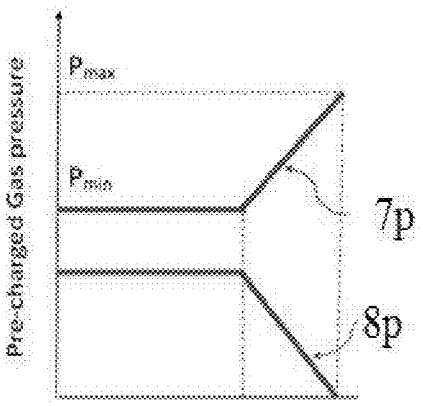
Figure 2B:
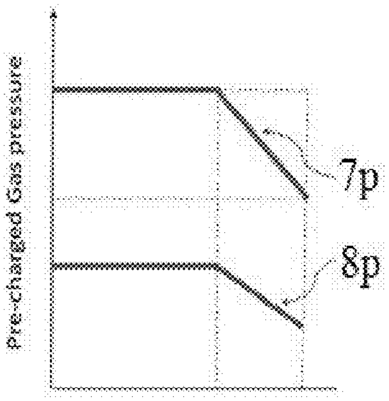
FIG. 2B is a line graph showing pressure gradient of the gas and the liquid when the gas leaks into a liquid chamber.

FIG. 1 shows a piston type hydro pneumatic accumulator (20) with internal leak detection as per present invention. The piston type hydro pneumatic accumulator (20) comprises of a cylindrical barrel (3), a floating piston (4), a gas end cover (5) and a liquid end cover (6). A first pressure meter (10) and a second pressure meter (11) are disposed as shown. The accumulator has a gas chamber (7) and a liquid chamber (8). Generally, the liquid chamber (8) is connected to any point of application. FIG. 2A which shows situation of liquid (8L) leaking into gas chamber (7) causing a rise in a gas pressure (7*p*) and a fall in a liquid pressure (8*p*), and FIG. 2B which shows situation of gas (7G) leaking into liquid chamber (8) causing a fall in the gas pressure (7*p*) as well as a fall in the liquid pressure (8*p*), essentially indicate that whether gas (7G) leaks into liquid chamber (8) or liquid (8L) leaks into gas chamber (7), the liquid pressure (8*p*) falls; and consequently the accumulator fails to perform satisfactorily.

Figure 3A:
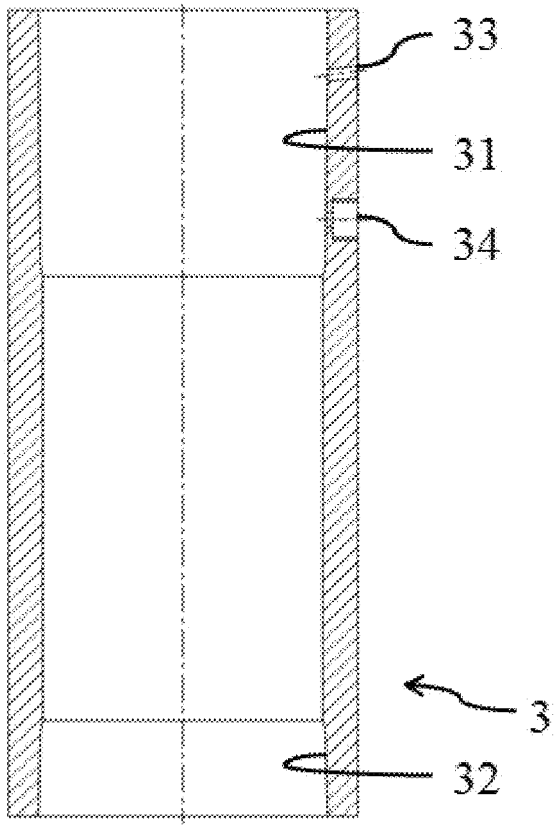
FIG. 3A to FIG. 3E shows parts of the first embodiment of the hydro pneumatic accumulator.

FIG. 3A, the cylindrical barrel (3) has a first internal surface (31) and a second internal surface (32), and open ends on either side. The first internal surface (31) of the cylindrical barrel (3) has optionally a first orifice (33) and necessarily a second orifice (34). The first internal surface (31) and the second internal surface (32) have internal threads.

Figure 3B:
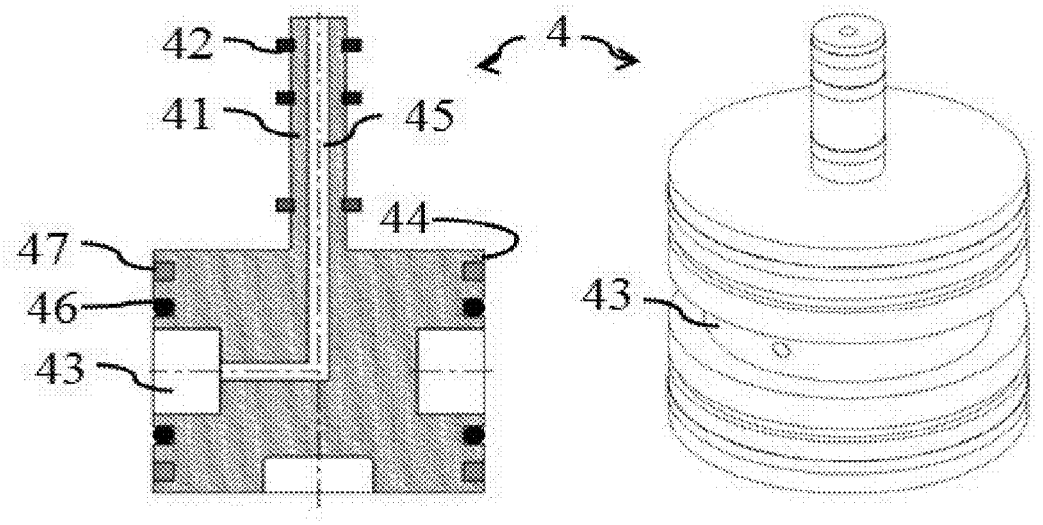

FIG. 3B, the floating piston (4) has a guide shaft (41). The guide shaft (41) has provisions to mount a plurality of shaft rings (42). There is an annular hollow ring (43) around a rubbing surface (44) of the floating piston (4). There is a hollow tube (45), axial to the guide shaft (41), the hollow tube (45) extends into the annular hollow ring (43). There is provided a plurality of sealing rings (46) and a plurality of piston rings (47).

Figure 3C:
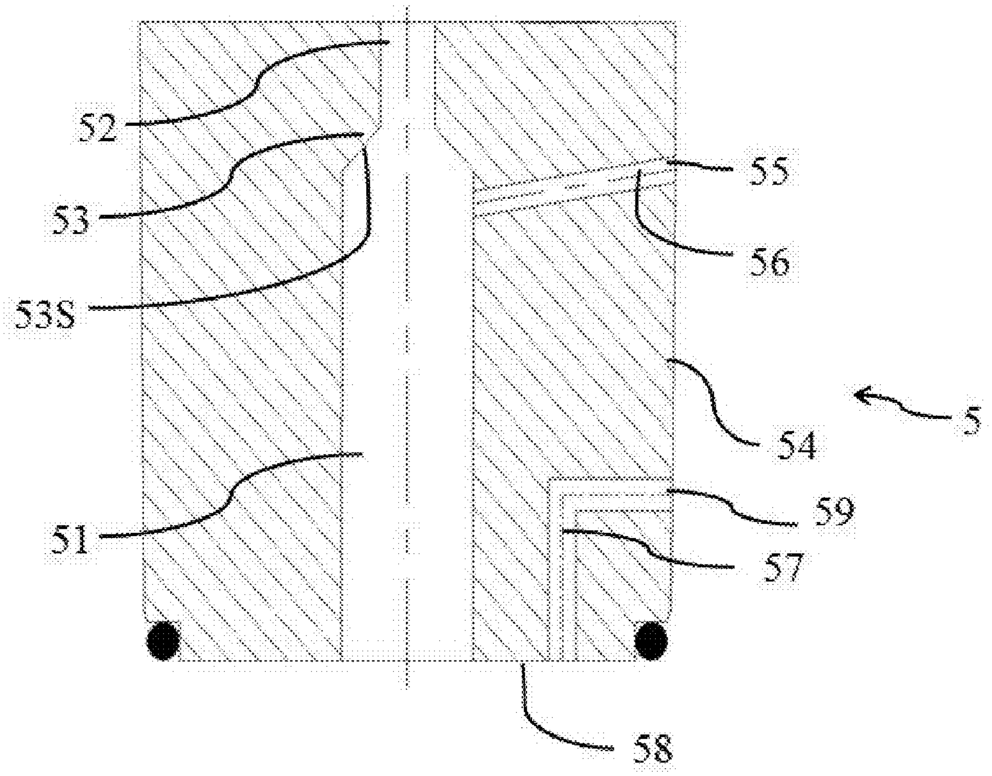

FIG. 3C, the gas end cover (5) has an external cylindrical surface (54). The external cylindrical surface (54) has external threads compatible with the internal threads on the first internal surface (31) of the cylindrical barrel (3), such that the external cylindrical surface (54) of the gas end cover (5) assembly forms a hermetic sealing with the first internal surface (31) of the cylindrical barrel (3) after the corresponding threads are engaged and tightened so as to dispose the gas end cover (5) in the cylindrical barrel (3). The hermetic sealing can be obtained in any other known manner as well.

The hydro pneumatic accumulator (20) has a leakage detection construction. In the preferred embodiment, the gas end cover (5) has an integrated leakage detection construction. In FIG. 3C, the leakage detection construction comprises a first cylindrical channel (51) commencing from an inner face (58) of the gas end cover (5). The internal diameter of the first cylindrical channel (51) is commensurate with the external diameter of the guide shaft (41) such that the guide shaft (41) with shaft rings (42) disposed thereon, that can move to and fro in the first cylindrical channel (51) while completely insulating the gas chamber (7) from the first cylindrical channel (51). The first cylindrical channel (51) reduces to a conical channel (53) having an inclined surface (53S) and the conical channel (53) further reduces to a second cylindrical channel (52), which is narrower. A connection path (56), which is hollow, commences from an upper region of the first cylindrical channel (51) and the distant opening (55) of the connection path (56) opens from the external cylindrical surface (54) of the gas end cover (5). A re-charge path (57), which is hollow, having a re-charge path opening (59) commences from the external cylindrical surface (54) of the gas end cover (5). The other open end of the re-charge path (57) is on the inner face (58) of the gas end cover (5).

As the gas end cover (5) is mounted into the cylindrical barrel (3), the distant opening (55) of the connection path (56) aligns axially with the first orifice (33) of the cylindrical barrel (3) and the re-charge path opening (59) axially aligns with the second orifice (34) of the cylindrical barrel (3).

Figure 3D:
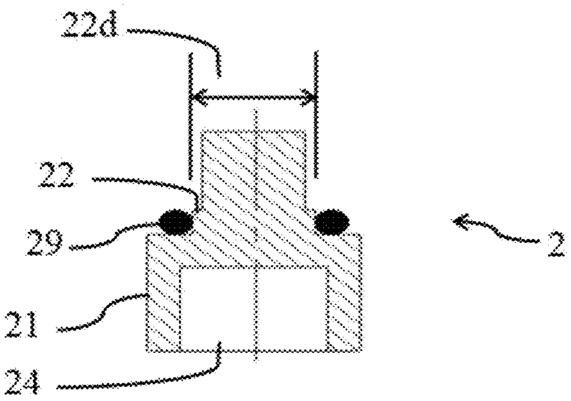

FIG. 3D, a floater device (2) comprises of a floater (21) and an O-ring (29). The floater (21) is of a material which is chemically neutral with respect to a gas (7G) and a liquid (8L) with which the gas chamber (7) and the liquid chamber (8) of the hydro pneumatic accumulator (20) respectively are filled. The floater (21) has a hollow zone (24) of a volume such that when the hollow zone (24) is filled with the gas (7G) then a weight of the floater (21) more or less balances the buoyant force of the gas (7G), and therefore the floater device (2) remains suspended or sunk in the gas (7G); while when the hollow zone (24) is filled with the rising liquid (8L) from below the floater device (2) then the buoyant force of the liquid (8L) is significantly higher than the weight of the floater device (2) and the floater device (2) floats on the liquid (8L).

An outside diameter (22*d*) of a neck (22) of the floater (21) is such that an O-ring (29) provided on the neck (22) presses against the inclined surface (53S) of the conical channel (53) with a force sufficient to cut off the first cylindrical channel (51) from the second cylindrical channel (52), when the first cylindrical channel (51) is filled with the liquid (8L).

Figure 3E:
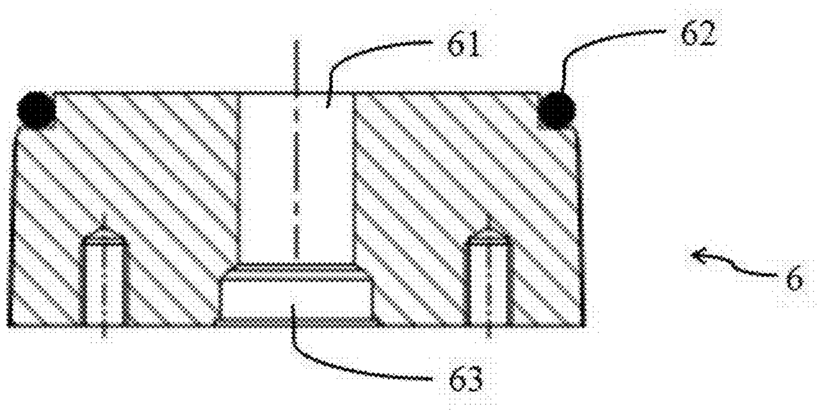

FIG. 3E, the liquid end cover (6) has an axial bore (61) and a connection flange (63). The liquid end cover (6) is fitted into the cylindrical barrel (3) at the other end, and in the manner similar to the gas end cover (5), along with a liquid sealing ring (62) of appropriate dimensions.

FIG. 1, read with FIGS. 3A and 3C, a first pressure meter (10) is mounted on the first orifice (33) of the cylindrical barrel (3) while a second pressure meter (11) is mounted on the second cylindrical channel (52).

The hydro pneumatic accumulator (20) is connected to the point of application from the connection flange (63) of the liquid end cover (6), wherefrom certain amount of liquid (8L) gushes into the liquid chamber (8) and fills the liquid chamber (8). Next, the gas (7G) is filled into the gas chamber (7) through the second orifice (34) of the cylindrical barrel (3) so that the floating piston (4) occupies a position where the liquid chamber (8) attains the desired pressure to be maintained. Any rise in the pressure in the liquid chamber (8) causes the floating piston (4) to shift to a new position and transfers the potential energy to the gas chamber (7). Likewise, the reverse happens in the event of the pressure falling in the liquid chamber (8). The hydro pneumatic accumulator (20), when free from internal leakage, is expected to remain in this equilibrium state for considerable time.

Figure 4A:
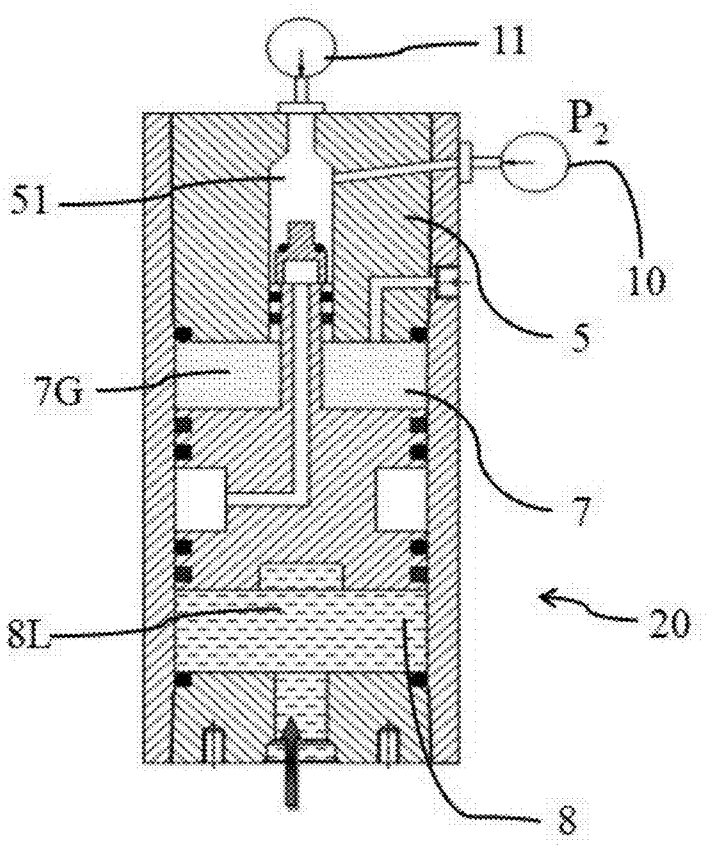
FIG. 4A to FIG. 4E show healthy situation and different situations of inter-chamber leakage for the first embodiment of the hydro pneumatic accumulator.

FIG. 4A, when there is no internal leakage of the gas (7G) into the liquid chamber (8) or the liquid (8L) into the gas chamber (7), the first cylindrical channel (51) of the gas end cover (5) is free of any gas (7G) or liquid (8L), and the first pressure meter (10) as well as the second pressure meter (11) shows a zero reading.

Figure 4B:
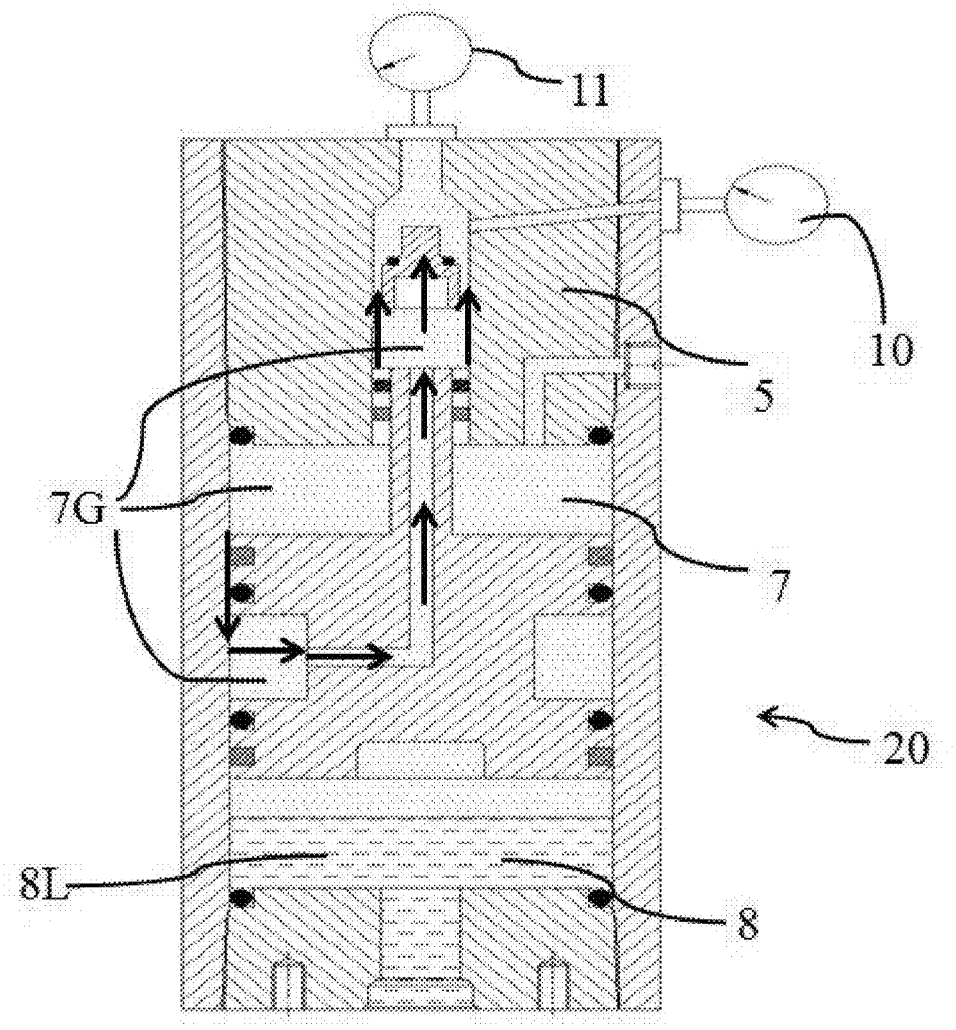

FIG. 4B, seen along with FIGS. 3B, 3C, 3D, when there is a leakage of the gas (7G) towards the liquid chamber (8), the gas (7G) first ingresses to the annular hollow ring (43) of the floating piston (4), then through the hollow tube (45) of the floating piston (4), fills in the hollow zone (24) of the floater (21). The floater device (2) attains suspended position & lets the gas (7G) fill the first cylindrical channel (51), the conical channel (53) and the second cylindrical channel (52). The first pressure meter (10) as well as the second pressure meter (11) shows a low non-zero reading, indicating a gas (7G) leak towards or into the liquid chamber (8). When the gas (7G) leakage is rapid such that the gas (7G) also reaches the liquid chamber (8) as shown by arrows in FIG. 4D, the outcome is the same, that is, the first pressure meter (10) as well as the second pressure meter (11) shows the low but non-zero reading.

Figure 4C:
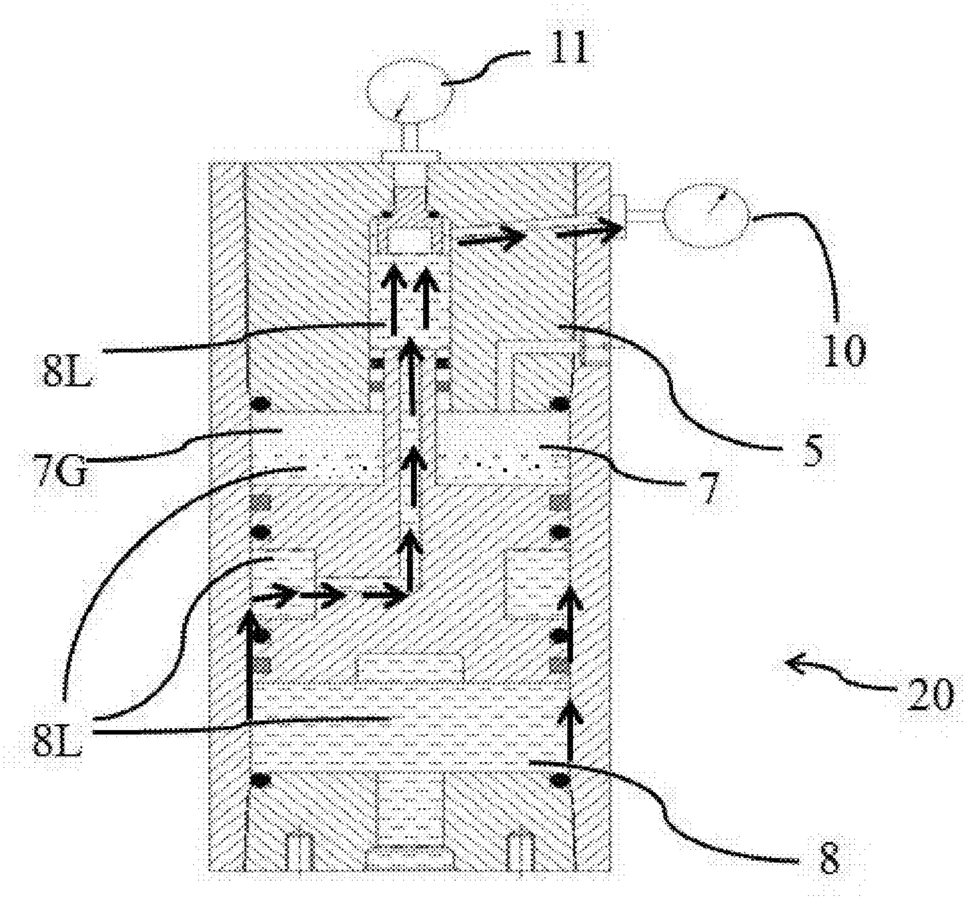
Figure 4D:
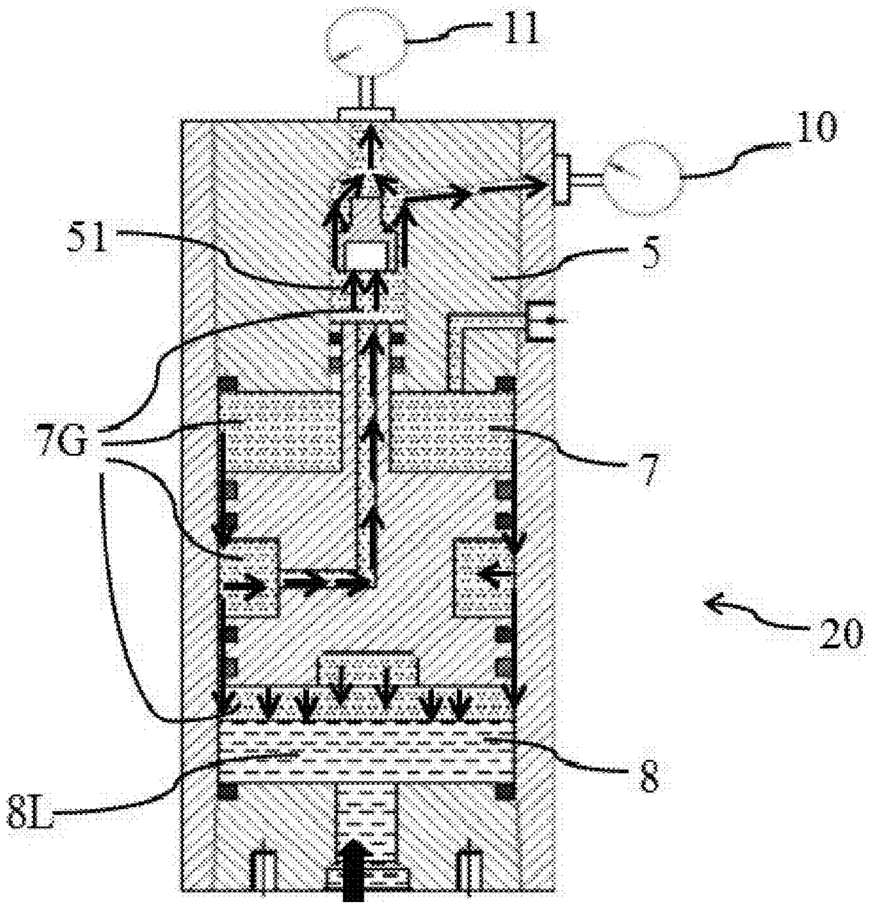
Figure 4E:
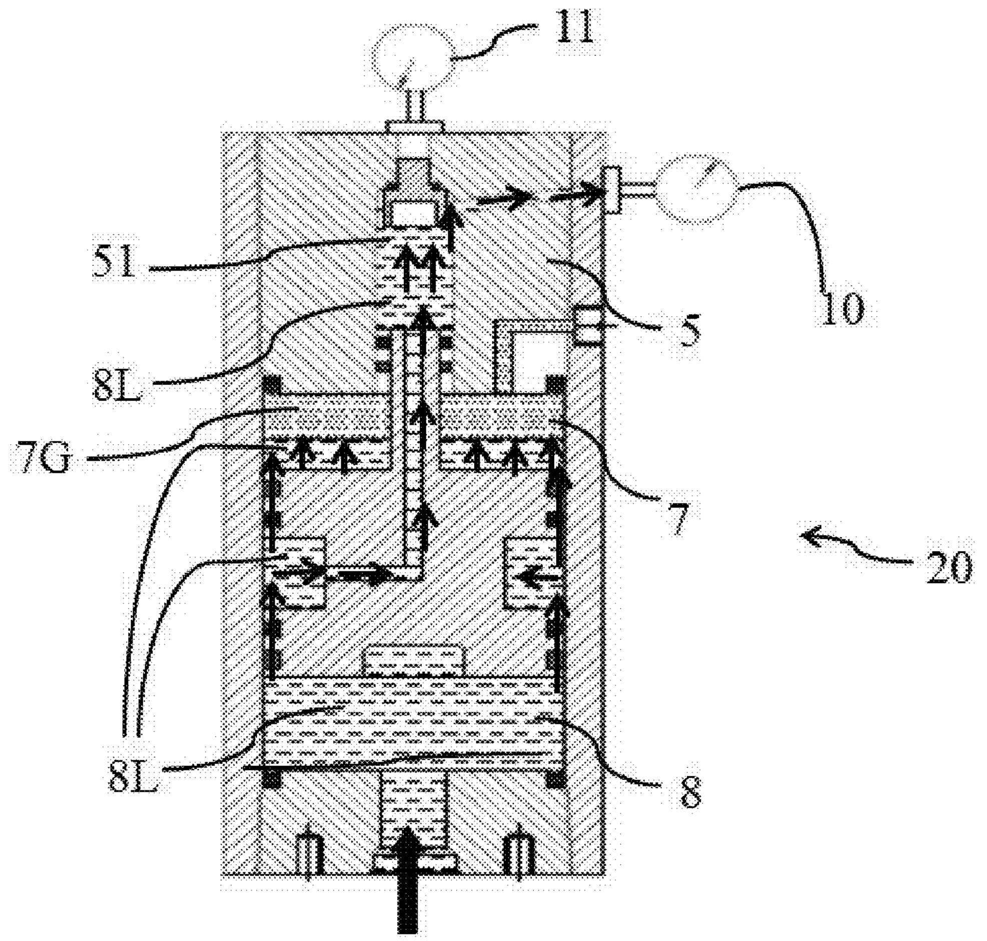

FIG. 4C, seen along with FIGS. 3B, 3C, 3D, when there is a leakage of the liquid (8L) towards the gas chamber (7), the liquid (8L) first ingresses to the annular hollow ring (43) of the floating piston (4), then starts filling in the hollow zone (24) of the floater (21) through the hollow tube (45) of the floating piston (4). This causes the floater device (2) to experience a, buoyancy force higher than its weight. Consequently, the floater device (2) starts rising up towards the conical channel (53) as more and more liquid (8L) arrives in the first cylindrical channel (51), till the O-ring (29) of the floater device (2) mates with the inclined surface (53S) of the conical channel (53) and insulates the second cylindrical channel (52) from the first cylindrical channel (51). In such a situation, the second pressure meter (11) shows a zero reading while the first pressure meter (10) shows a substantially high reading, inferring the liquid (8L) leak into or towards the gas chamber (7). When the liquid (8L) leakage is rapid such that the liquid (8L) also reaches the gas chamber (7) as shown by arrows in FIG. 4E, the outcome is the same, that is, the second pressure meter (11) shows the zero reading while the first pressure meter (10) shows the substantially high pressure.

Figure 5A:
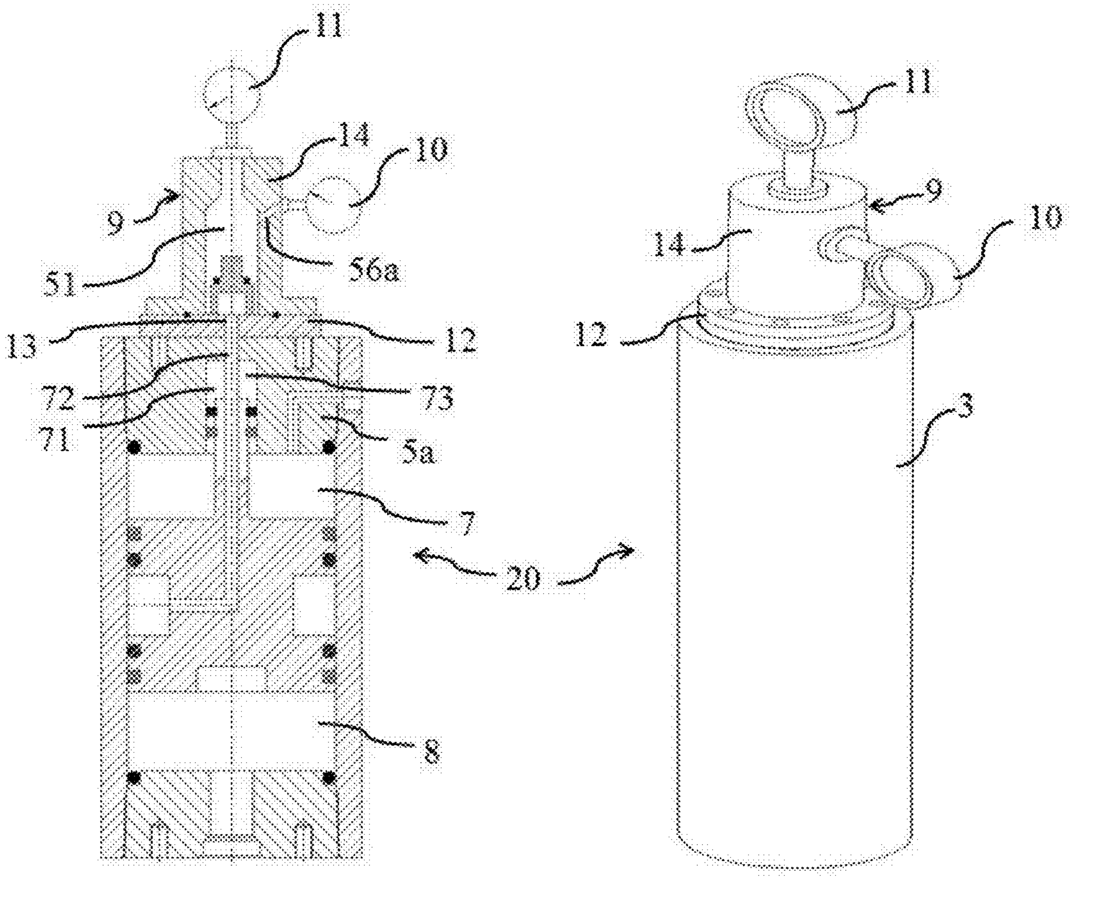
FIG. 5A to FIG. 5E show healthy situation and different situations of inter-chamber leakage for the second embodiment of the hydro pneumatic accumulator.

As another embodiment, shown in FIG. 5A, the leakage detection construction is a separable component (9), mounted on an interface plate (12). The interface plate (12) in-turn is disposed on the gas end cover (5*a*). The gas end cover (5*a*) has a cylindrical bore (71) and a narrower axial path (72), joining the cylindrical bore (71) to the narrower axial path (72). The narrower axial path (72) connects the cylindrical bore (71) to the separable component (9) through an axial hole (13) of comparable diameter in the interface plate (12). The separable component (9) having the leakage detection construction comprises a first cylindrical channel (51) commencing from an inwards face of the interface plate (12). The first cylindrical channel (51) in the separable component (9) reduces to the conical channel (53) having and inclined surface (53S) and the conical channel (53) further reduces to a second cylindrical channel (52), which is narrower. A connection path (56*a*), which is hollow, commences from an upper region of the first cylindrical channel (51) and the opening of the connection path (56*a*) opens from an external surface (14) of the separable component (9). When assembled, the axis of the cylindrical bore (71), the axis of the axial hole (13) and the axis of the first cylindrical channel (51) are aligned.

Figure 5B:
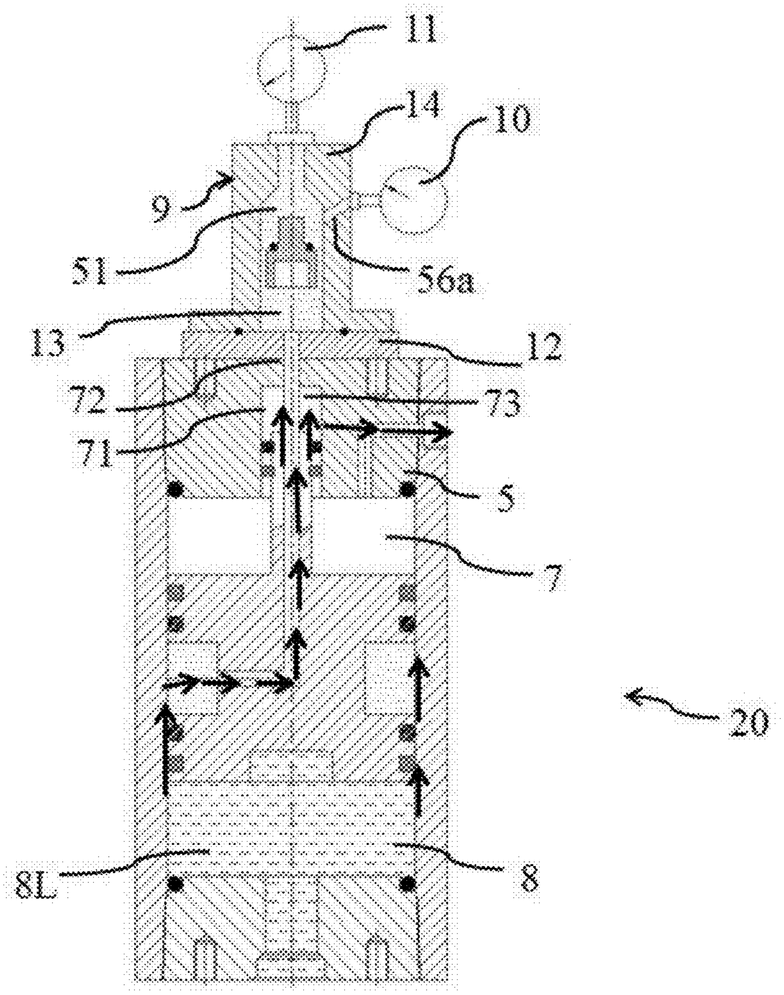

FIG. 5B, in the event of the gas (7G) leaking and reaching the annular hollow ring (43) of the floating piston (4), the gas (7G) fills in the upper region (73) of the cylindrical bore (71) through the hollow tube (45), then fills in the hollow zone (24) of the floater (21) through the narrower axial path (72) of the gas end cover (5*a*) and the axial hole (13) of the interface plate (12). The floater device (2) attains suspended position & then lets fill in the first cylindrical channel (51), the conical channel (53) and the second cylindrical channel (52). The first pressure meter (10) as well as the second pressure meter (11) shows a low non-zero reading, indicating gas (7G) leak into liquid (8L). When the gas (7G) leakage is rapid such that the gas (7G) also reaches the liquid chamber (8) as shown by arrows in FIG. 5D, the outcome is the same, that is, both the pressure meters (10, 11) show the low non-zero reading.

Figure 5C:
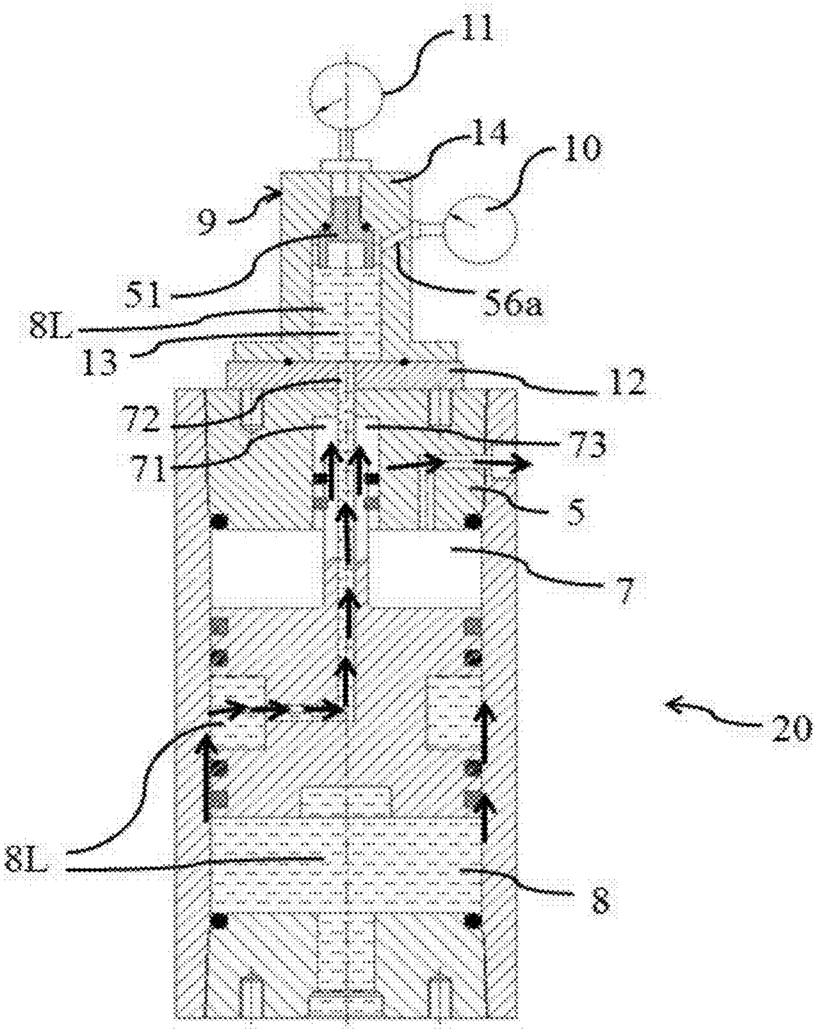
Figure 5D:
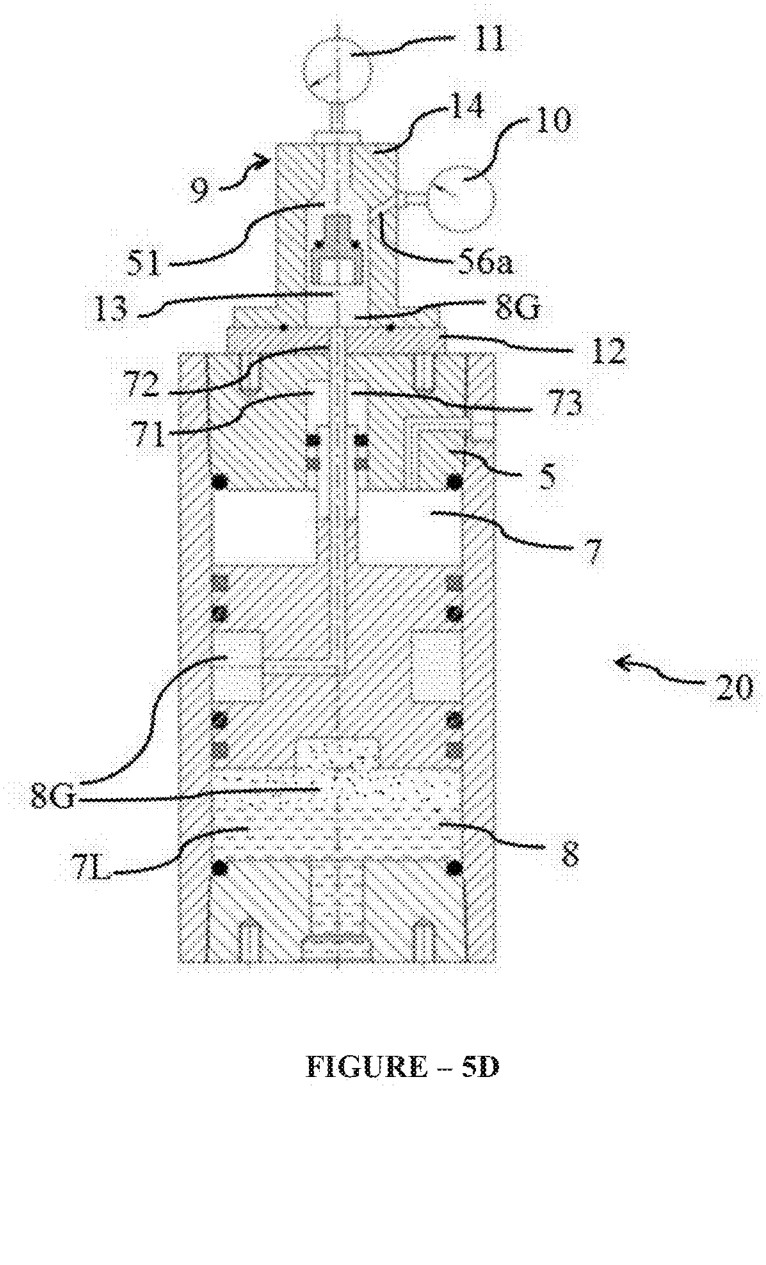
Figure 5E:
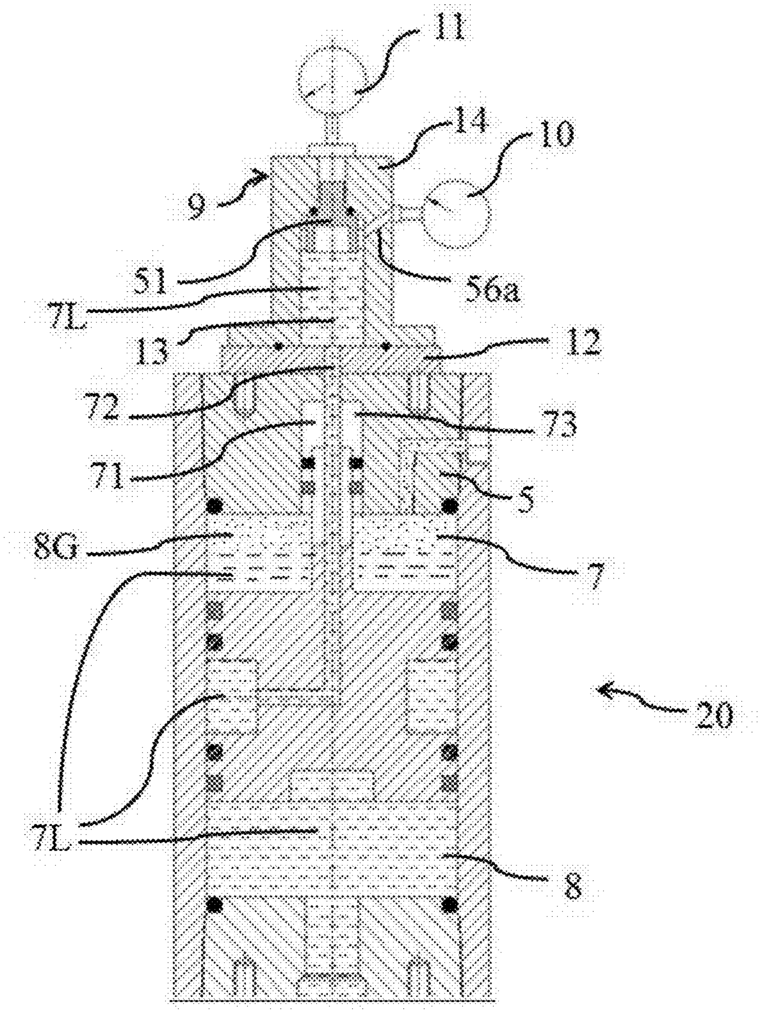

FIG. 5C, in the event of the liquid (8L) leaking and reaching the annular hollow ring (43) of the floating piston (4), the liquid (8L) fills in the upper region (73) of the cylindrical bore (71), then starts filling in the hollow zone (24) of the floater (21). This causes the floater device (2) to experience a buoyancy force higher than its weight. Consequently, the floater device (2) starts rising up towards the conical channel (53) till the O-ring (29) of the floater device (2) mates with the inclined surface (53S) of the conical channel (53) and insulates the second cylindrical channel (52) from the first cylindrical channel (51). In such a situation, the second pressure meter (11) shows a zero reading while the first pressure meter (10) shows a substantially high reading, inferring the liquid (8L) leak into the gas chamber (7). When the liquid (8L) leakage is rapid such that the liquid (8L) also reaches the gas chamber (7) as shown by arrows in FIG. 5E, the outcome is the same, that is, the second pressure meter (11) shows the zero reading while the first pressure meter (10) shows the substantially high pressure.

Figures 6A, 6B:
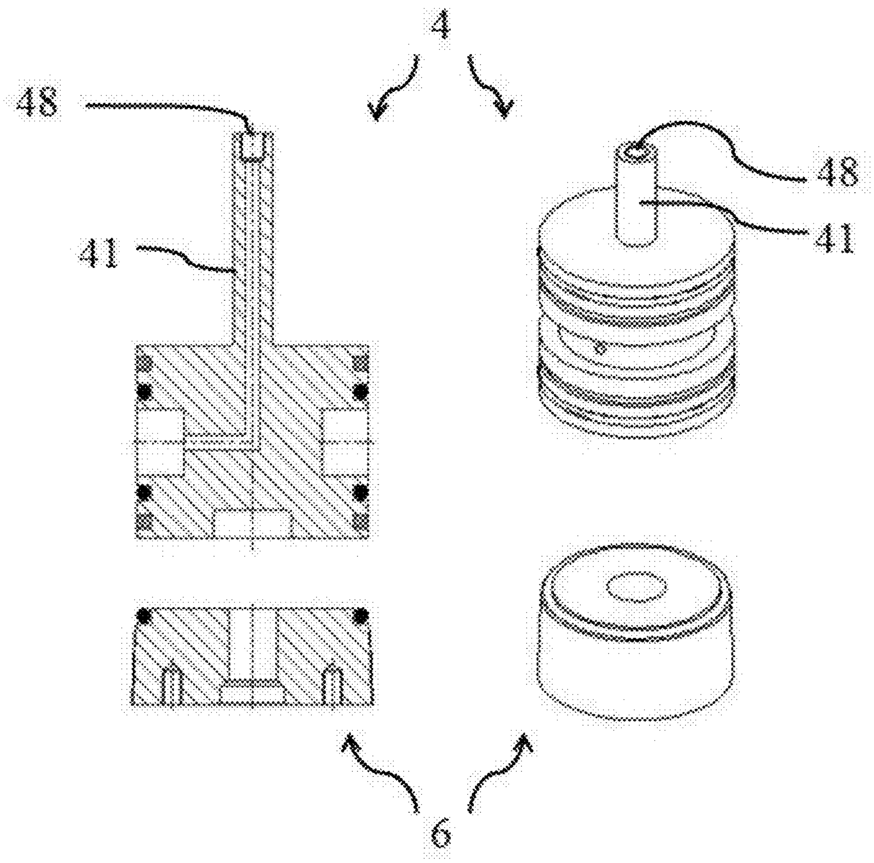
Figure 7A:
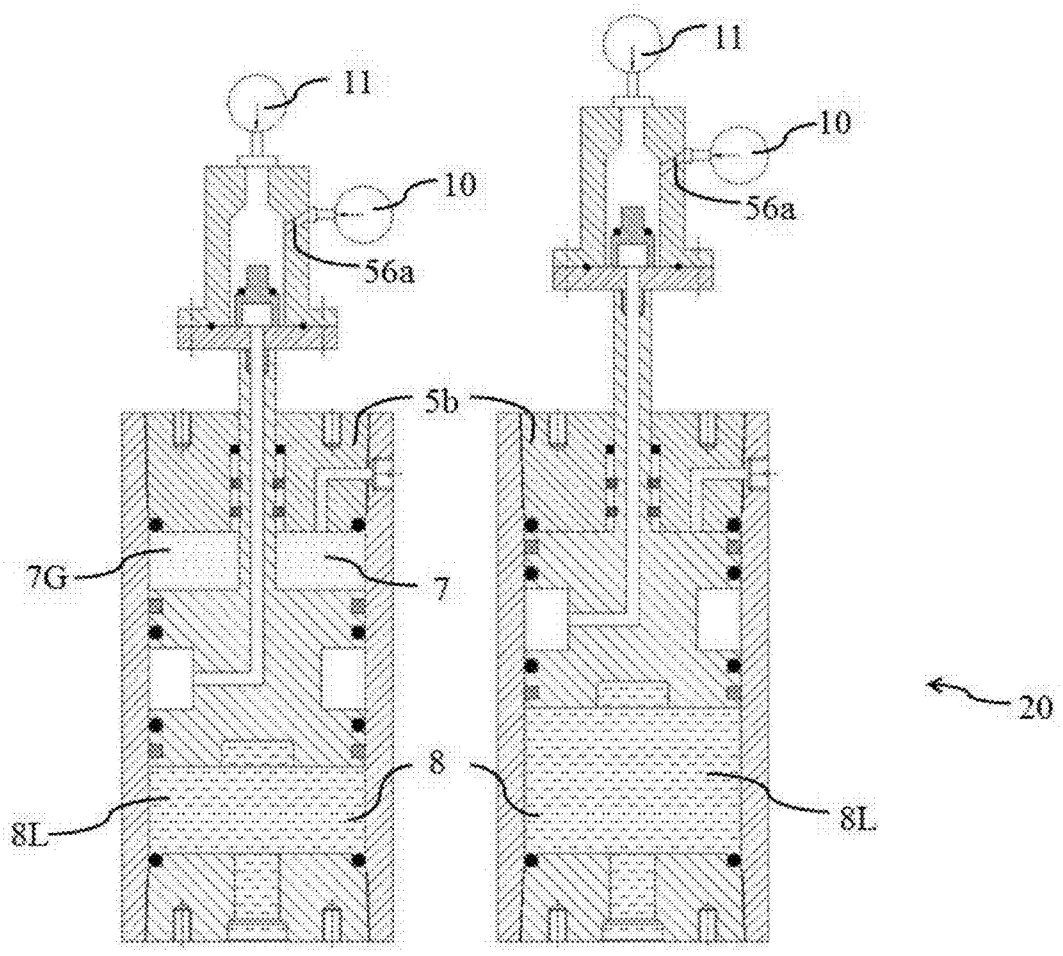
FIG. 7A to FIG. 7E show healthy situation and different situations of inter-chamber leakage for the third embodiment of the hydro pneumatic accumulator.

As another embodiment shown in FIG. 7A, there is a leakage detection construction as a separable component (9), mounted on an interface plate (12). The interface plate (12) in-turn is disposed on a transversal face (48) of the guide shaft (41) of the floating piston (4), shown in FIG. 6A. The interface plate (12) has an axial hole (13) which connects the hollow zone (24) of the floater (21) to the hollow tube (45) of the floating piston (4). The gas end cover (5*b*) has a stepped through cylindrical bore (71*b*). The separable component (9) having the leakage detection construction comprises a first cylindrical channel (51) commencing from an inwards face of the interface plate (12). The first cylindrical channel (51) in the separable component (9) reduces to the conical channel (53) having an inclined surface (53S) and the conical channel (53) further reduces to a second cylindrical channel (52), which is narrower. A connection path (56*a*), which is hollow, commences from an upper region of the first cylindrical channel (51) and the opening of the connection path (56*a*) opens from an external surface (14) of the separable component (9). When assembled, the axis of the stepped through cylindrical bore (71*b*), the axis of the narrow axial hole (13) and the axis of the first cylindrical channel (51) are aligned.

Consequent to the interface plate (12) disposed on the transversal end (48) of the floating piston (4), the separable component (9) along with the floating device (2) therein, the first pressure meter (10) and the second pressure meter (11) thereon, and the interface plate (12), keep moving up and down in accordance with the movement of the floating piston (4) during the normal course of working of the hydro pneumatic accumulator (20).

Figure 7B:
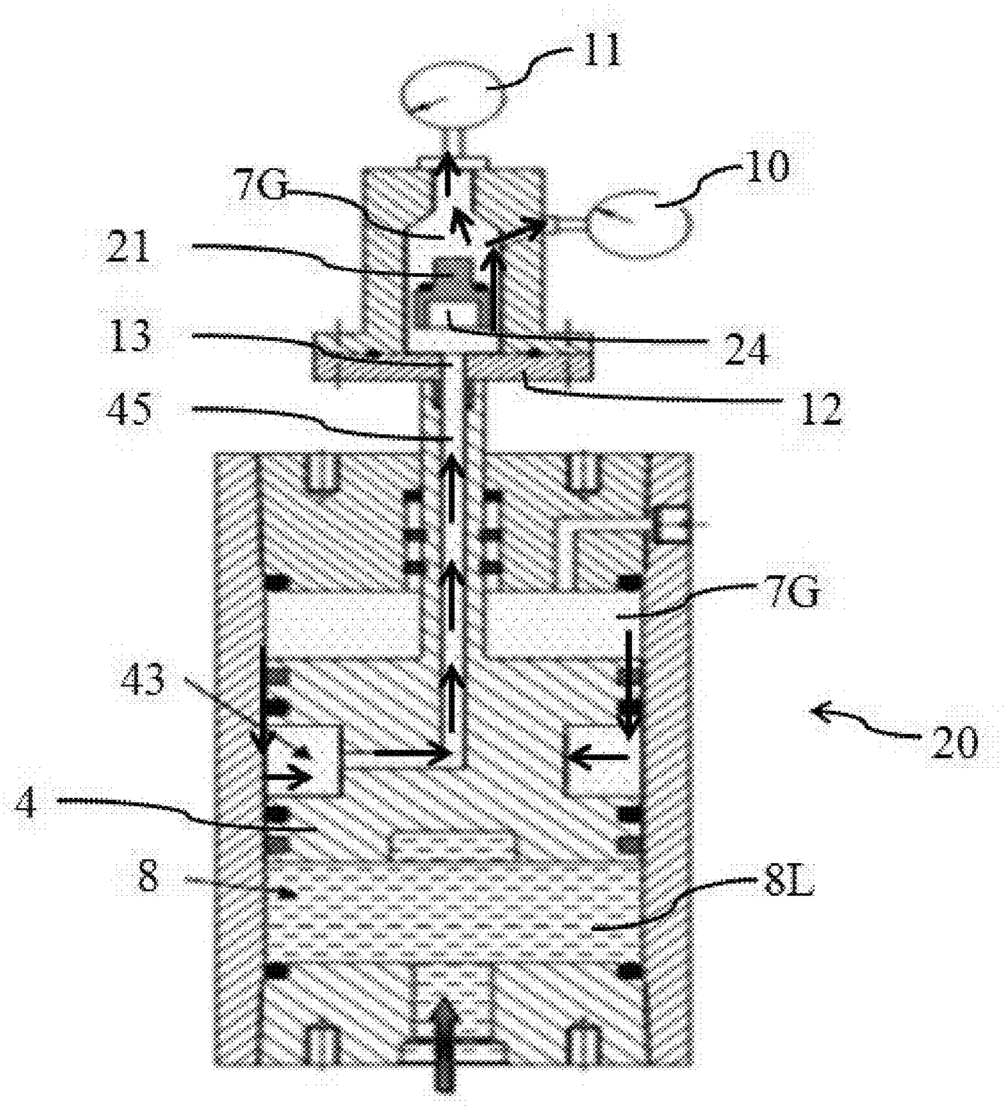

FIG. 7B, in the event of the gas (7G) leaking and reaching the annular hollow ring (43) of the floating piston (4), the gas (7G) fills in the hollow zone (24) of the floater (21) through the hollow tube (45) of the floating piston (4) and the axial hole (13) of the interface plate (12). The floater device (2) attains suspended position & then lets the gas (7G) fill the first cylindrical channel (51), the conical channel (53) and the second cylindrical channel (52). Both the pressure meters show a low non-zero reading, indicating gas (7G) leakage. When the gas (7G) leakage is rapid such that the gas (7G) also reaches the liquid chamber (8) as shown by arrows in FIG. 7D, the outcome is the same, that is, both the pressure meters show the low non-zero reading.

Figure 7C:
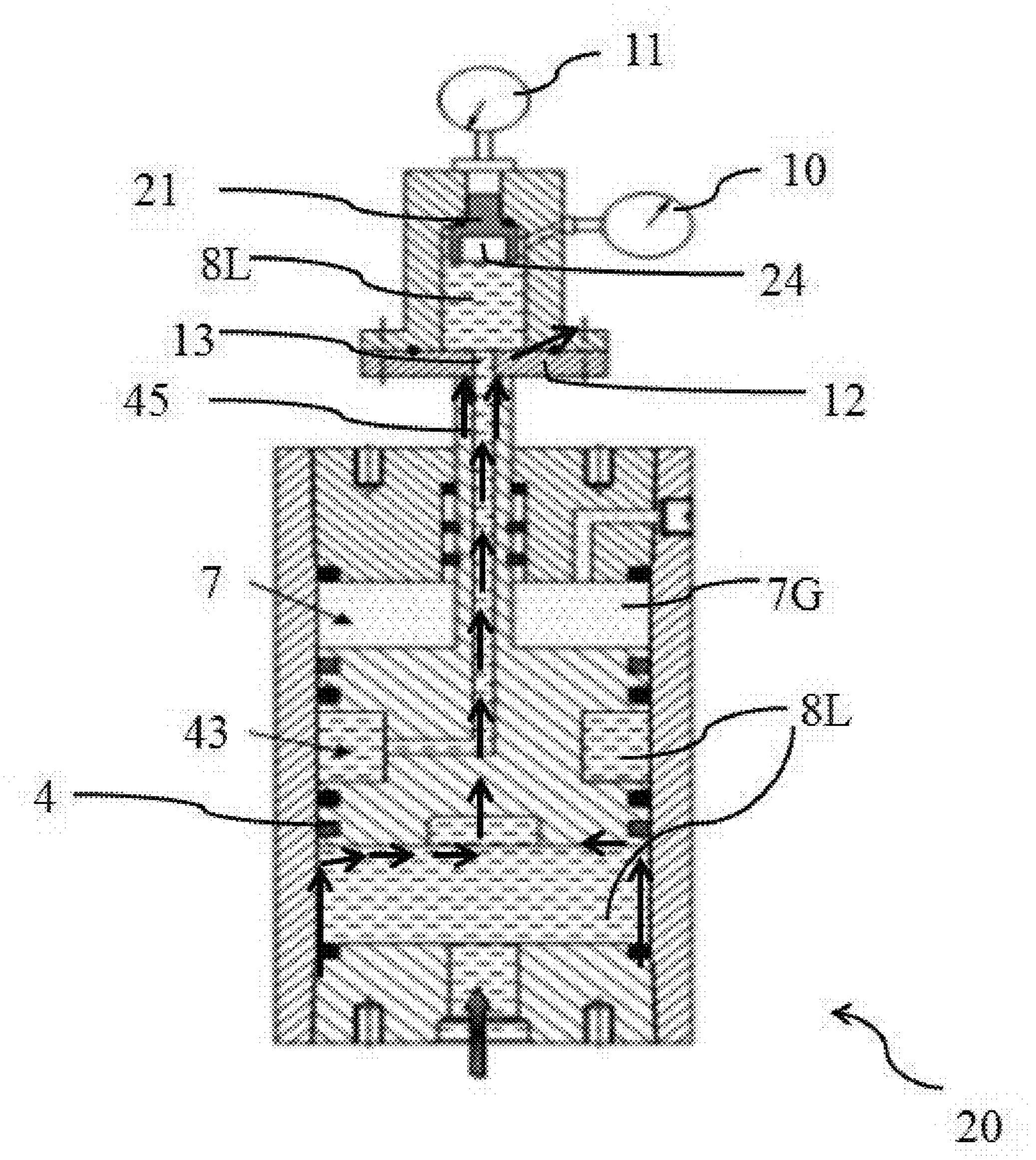
Figure 7D:
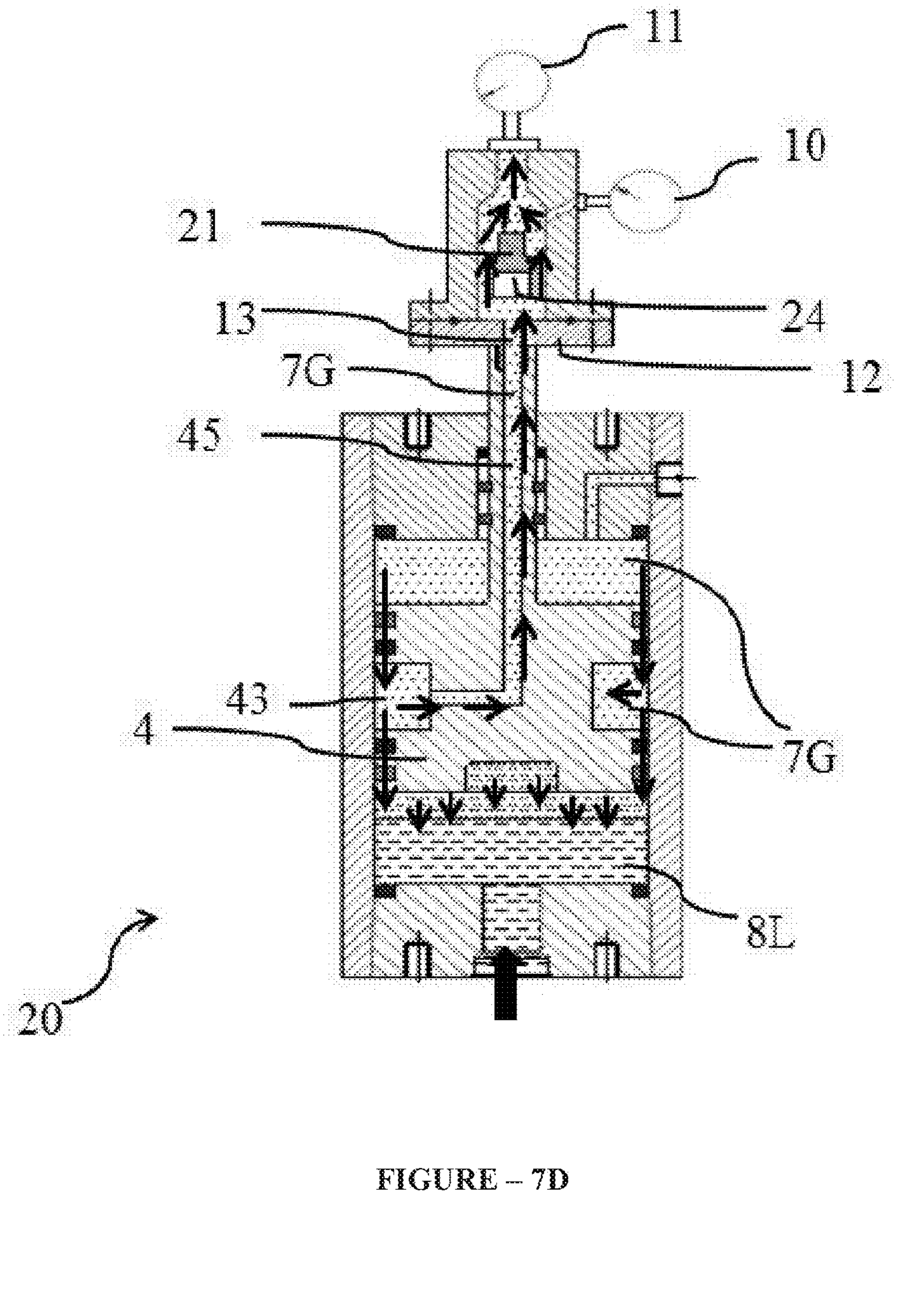
Figure 7E:
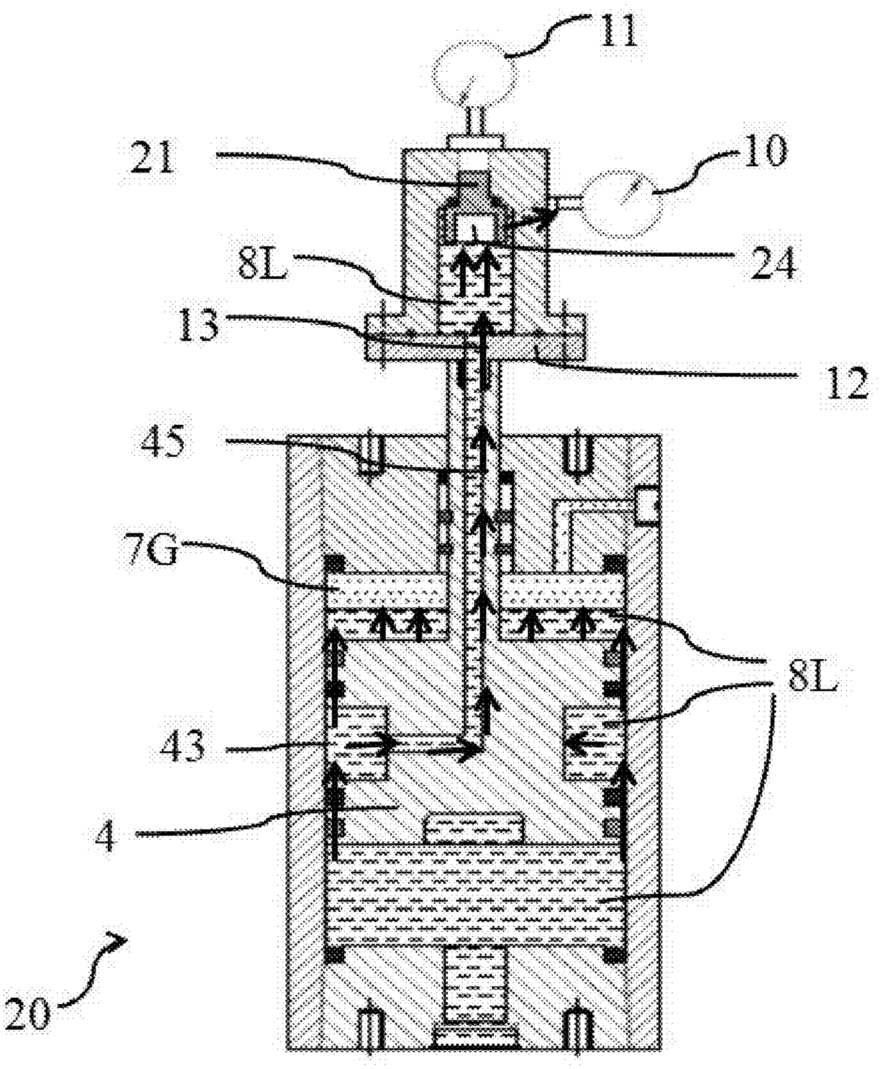

FIG. 7C, in the event of the liquid (8L) leaking and reaching the annular hollow ring (43) of the floating piston (4), the liquid (8L) starts filling in the hollow zone (24) of the floater (21) through the hollow tube (45) of the floating piston (4) and the axial hole (13) of the interface plate (12). This causes the floater device (2) to experience a buoyancy force higher than its weight. Consequently, the floater device (2) starts rising up towards the inclined surface (53S) of the conical channel (53) till the O-ring (29) of the floater device (2) mates with the inclined surface (53S) of the conical channel (53) and insulates the second cylindrical channel (52) from the first cylindrical channel (51). In such a situation, the second pressure meter (11) shows a zero reading while the first pressure meter (10) shows a substantially high reading, inferring the liquid (8L) leak into the gas chamber (7). When the liquid (8L) leakage is rapid such that the liquid (8L) also reaches the gas chamber (7) as shown by arrows in FIG. 7E, the outcome is the same, that is, the second pressure meter (11) shows the zero reading while the first pressure meter (10) shows a substantially high pressure.

Figure 8:
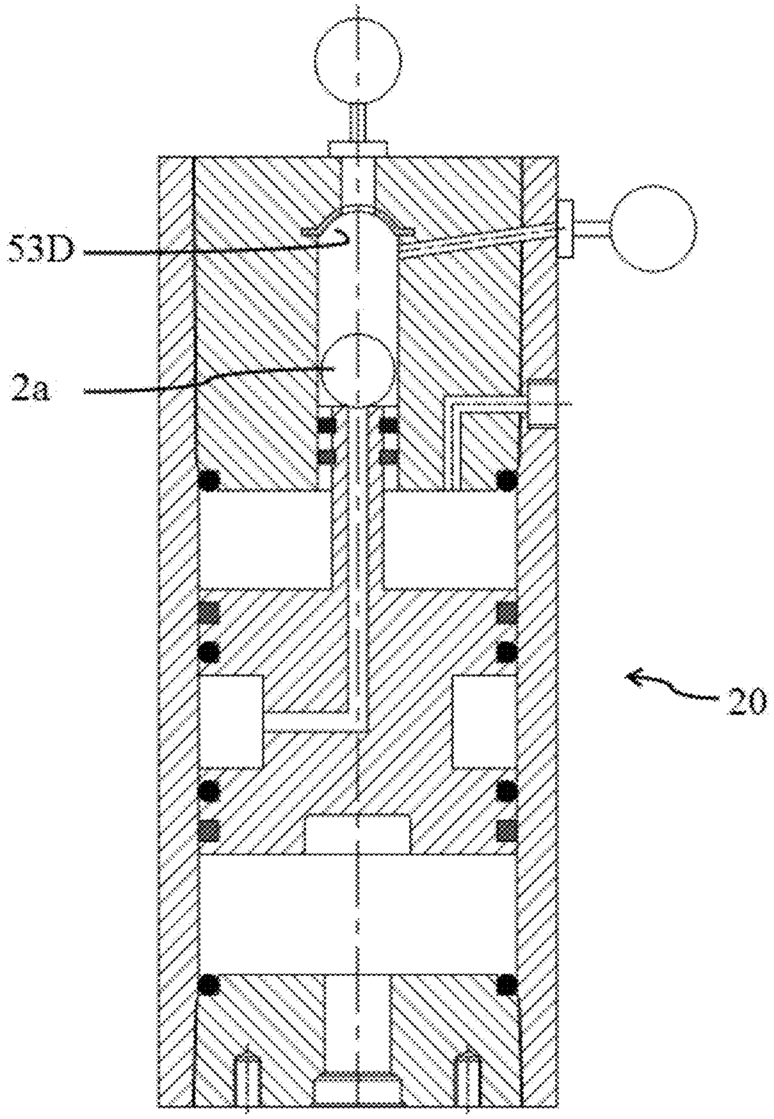
FIG. 8 shows an embodiment with a spherical floater.

FIG. 8, as another embodiment, the floater device (2*a*) is spherical in shape, and of a material which is chemically neutral with respect to a gas (7G) and a liquid (8L) with which the gas chamber (7) and the liquid chamber (8) of the hydro pneumatic accumulator (20) are filled. The spherical floater (2*a*) is of such dimension that a volume of substantially half of the spherical floater (2*a*) more or less balances the buoyant force of the gas (7G), and therefore the spherical floater (2*a*) remains suspended or sunk in the gas (7G); while when the first cylindrical channel (51) is filled with the liquid (8L) then the buoyant force of the liquid (8L) is much higher than the weight of the floater (21) and the spherical floater (2*a*) floats on the liquid (8L). The leakage detection construction has a dome shape (53D), the dome being concentric to the spherical floater (2*a*), instead of the conical channel (53).

Figure 9:
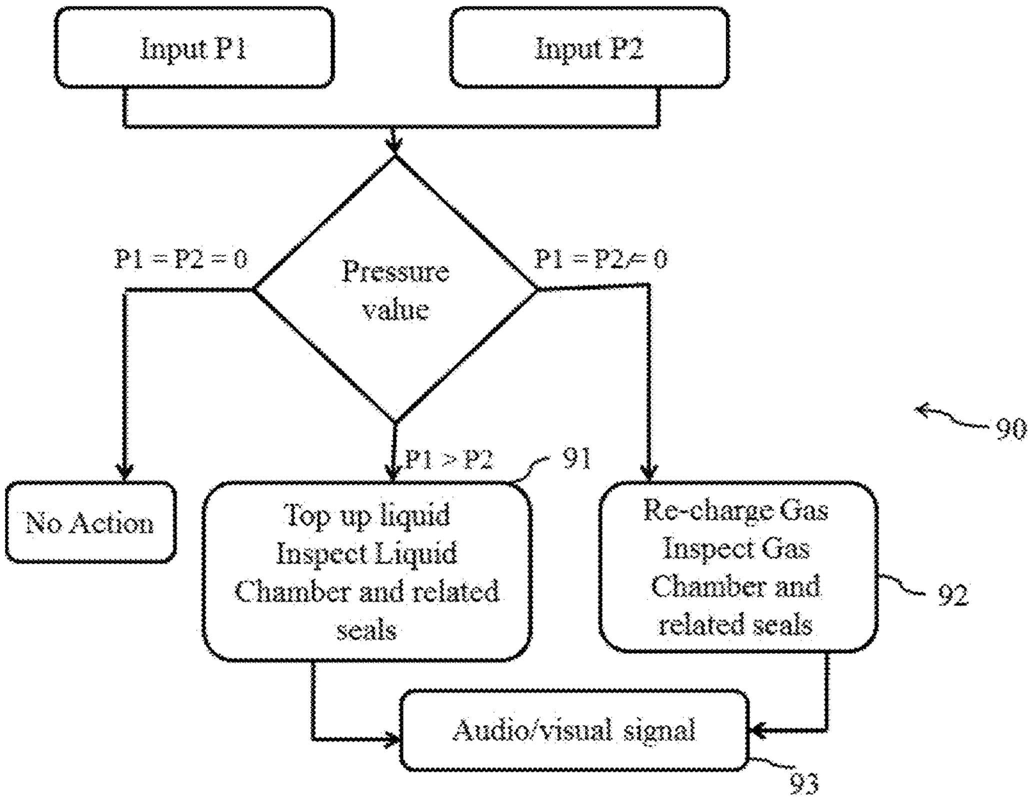
FIG. 9 is a flow diagram showing expressions of relation between readings of pressure sensors and consequent corrective action.

FIG. 9 shows a flow diagram (90). In place of, or, in additional to, the pressure meters (10, 11) as shown in FIGS. 1, 4A, 5A, et cetera; pressure switches that is, a first pressure switch and a second pressure switch, are provided (not shown), whose output is connected to a known programmable logic controller. If the pressure sensed by the first pressure switch is P1 and the pressure sensed by the second pressure switch is P2, then the programmable logic controller is programmed so as to activate A liquid circuit for topping up of the liquid (8L) if $P1>P2$ (91);

A gas circuit for re-charging of gas (7G) if $P1=P2\neq 0$ (92);

Producing visual and or audio signal or a combination thereof (93); or

Initiate any other corrective action.

The invention claimed is:

1. A piston type hydro pneumatic accumulator with internal leak detection having a gas chamber and a liquid chamber, the piston type hydro pneumatic accumulator comprising a cylindrical barrel having a first internal surface and a second internal surface, and a second orifice;

a floating piston with a plurality of sealing rings and a plurality of piston rings, having a guide shaft with provision to mount a plurality of shaft rings, an annular hollow ring around a rubbing surface of the floating piston, a hollow tube axial to the guide shaft, the hollow tube extending into the annular hollow ring;

a gas end cover having a hollow re-charge path, an opening of the hollow re-charge path commences from an external surface of the gas end cover, another open end of the hollow re-charge path on an inner face of the gas end cover;

a liquid end cover having an axial bore and a connection flange;

a leakage detection construction having a first cylindrical channel, the first cylindrical channel reduces to a conical channel, the conical channel further reduces to a second cylindrical channel which is narrower, the conical channel having an inclined surface, a connection path which is hollow, the connection path commencing from an upper region of the first cylindrical channel;

a floater device, made of a chemically neutral material with respect to a gas and a liquid with which the gas chamber and the liquid chamber of the hydro pneumatic accumulator respectively are filled; and a first pressure meter and a second pressure meter, the gas end cover and the liquid end cover hermetically disposed into the cylindrical barrel, the hollow recharge path opening axially aligns with the second orifice of the cylindrical barrel, the first pressure meter disposed so as to measure a pressure in the first cylindrical channel and the second pressure meter disposed so as to measure the pressure in the second cylindrical channel, the hydro pneumatic accumulator connectable to a point of application from the connection flange of the liquid end cover.

2. The piston type hydro pneumatic accumulator as claimed in claim 1, wherein the first internal surface of the cylindrical barrel has a first orifice.

3. The piston type hydro pneumatic accumulator as claimed in claim 1, wherein the first internal surface and the second internal surface have internal threads.

4. The piston type hydro pneumatic accumulator as claimed in claim 1, wherein the gas end cover has an external cylindrical surface, the external cylindrical surface has external threads compatible with internal threads on the first internal surface of the cylindrical barrel, such that the external cylindrical surface of the gas end cover assembly forms a hermetic sealing with the first internal surface of the cylindrical barrel after the corresponding threads are engaged and tightened.

5. The piston type hydro pneumatic accumulator as claimed in claim 1, wherein the gas end cover has the leakage detection construction, the leakage detection construction comprises the first cylindrical channel commencing from an inner face of the gas end cover, the internal diameter of the first cylindrical channel is commensurate with the external diameter of the guide shaft such that the guide shaft, with shaft rings disposed thereon, can move to and fro in the first cylindrical channel while completely insulating the gas chamber from the first cylindrical channel, the connection path having a distant opening, the distant opening of the connection path opens from the external surface of the gas end cover, the distant opening axially aligns with a first orifice of the gas cover when the gas end cover is mounted into the cylindrical barrel.

6. The piston type hydro pneumatic accumulator as claimed in claim 1, wherein the floater device comprises a floater and a O-ring.

7. The piston type hydro pneumatic accumulator as claimed in claim 1, wherein the floater has a hollow zone of a volume such that when the hollow zone is filled with the gas then a weight of the floater more or less balances the buoyant force of the gas, and the floater device remains suspended or sunk in the gas; while when the hollow zone is filled with the liquid from below then the buoyant force of the liquid is significantly higher than the weight of the floater device and the floater device floats on the liquid.

8. The piston type hydro pneumatic accumulator as claimed in claim 1, wherein the floater has a neck of an outside diameter such that a sealing ring provided on the neck presses against the inclined surface of the conical channel with a force sufficient to cut off the first cylindrical channel from the second cylindrical channel, when the first cylindrical channel is filled with the liquid, rising from bottom.

9. The piston type hydro pneumatic accumulator as claimed in claim 1, wherein the first pressure meter is mounted on the first orifice of the cylindrical barrel while the second pressure meter is mounted on the second cylindrical channel.

10. The piston type hydro pneumatic accumulator as claimed in claim 1, wherein the first pressure meter and the second pressure meter show a zero reading when the first cylindrical channel is free of any gas or liquid as there is no internal leakage of the gas into the liquid chamber or the liquid into the gas chamber.

11. The piston type hydro pneumatic accumulator as claimed in claim 1, wherein the first pressure meter and the second pressure meter shows a low non-zero reading when the first cylindrical channel is filled with the gas.

12. The piston type hydro pneumatic accumulator as claimed in claim 1, wherein the second pressure meter shows a zero reading while the first pressure meter shows a substantially high reading when the first cylindrical channel is filled with the liquid, rising from bottom.

13. The piston type hydro pneumatic accumulator as claimed in claim 1, wherein the floater device attains a suspended position when there is a gas leakage.

14. The piston type hydro pneumatic accumulator as claimed in claim 1, wherein the floater device with the sealing ring mates with the inclined surface of the conical channel and insulates the second cylindrical channel from the first cylindrical channel when there is a liquid leakage.

15. The piston type hydro pneumatic accumulator as claimed in claim 1, wherein the leakage detection construction is a separable component mounted on an interface plate, the interface plate in-turn disposed on the gas end cover, the gas end cover has a cylindrical bore and a narrower axial path, joining the cylindrical bore to the narrower axial path, the narrower axial path connects the cylindrical bore to the separable component through an axial hole of comparable diameter in the interface plate, the separable component having the leakage detection construction comprises a first cylindrical channel commencing from an inwards face of the interface plate, the axis of the cylindrical bore, the axis of the axial hole and the axis of the first cylindrical channel are aligned.

16. The piston type hydro pneumatic accumulator as claimed in claim 1, wherein the leakage detection construction as a separable component, mounted on an interface plate, the interface plate in-turn is disposed on a transversal face of the guide shaft of the floating piston, the interface plate has a narrower axial hole which connects the hollow zone of the floater to the hollow tube of the floating piston, the gas end cover has a stepped through cylindrical bore, the separable component having the leakage detection construction comprises a first cylindrical channel commencing from an inwards face of the interface plate, a hollow connection path, commences from an upper region of the first cylindrical channel and the opening of the connection path opens from an external surface of the separable component, the axis of the stepped through cylindrical bore, the axis of the narrow axial hole and the axis of the first cylindrical channel are aligned, the separable component along with the floating device therein, the first pressure meter and the second pressure meter thereon, and the interface plate, keep moving up and down in accordance with the movement of the floating piston during the normal course of working of the hydro pneumatic accumulator.

17. The piston type hydro pneumatic accumulator as claimed in claim 1, wherein the floater device is spherical and of such dimension that a volume of substantially half of the spherical floater more or less balances the buoyant force of the gas and the spherical floater remains suspended or sunk in the gas; while when the first cylindrical channel is filled with the liquid rising from a bottom then the buoyant force of the liquid is much higher than the weight of the floater and the spherical floater floats on the liquid, the leakage detection construction correspondingly has a dome shape instead of a conical channel, the dome being concentric to the spherical floater.

18. The piston type hydro pneumatic accumulator as claimed in claim 1, wherein the hydro pneumatic accumulator has a first pressure switch sensing a pressure P1 and a second pressure switch sensing a pressure P2, the output of the first pressure switch and the second pressure switch connected to a programmable logic controller, the programmable logic controller programmed so as to activate a liquid circuit for topping up of the liquid if $P1>P2$, activate a gas circuit for re-charging of gas if $P1=P2\neq0$, produce a visual and or an audio signal or a combination thereof, or initiate any other corrective action.

* * * * *